United States Patent
Miyahara et al.

(10) Patent No.: US 6,564,503 B1
(45) Date of Patent: May 20, 2003

(54) APPARATUS FOR TRAPPING AND KILLING INSECTS

(75) Inventors: Takakazu Miyahara, Kaseda (JP); Shoichi Izumi, Kagoshima (JP); Hidemi Kamiwada, Kagoshima (JP); Kaoru Takemura, Kagoshima (JP)

(73) Assignee: Elm, Inc., Kaseda (JP)

( * ) Notice: Subject to any disclaimer, the term of this patent is extended or adjusted under 35 U.S.C. 154(b) by 0 days.

(21) Appl. No.: 09/959,914

(22) PCT Filed: May 18, 2000

(86) PCT No.: PCT/JP00/03208

§ 371 (c)(1),
(2), (4) Date: Dec. 10, 2001

(87) PCT Pub. No.: WO00/69258

PCT Pub. Date: Nov. 23, 2000

(30) Foreign Application Priority Data

May 18, 1999 (JP) .......................... 11-137069

(51) Int. Cl.⁷ ................................................ A01M 1/22
(52) U.S. Cl. ........................................................ 43/112
(58) Field of Search ................................... 43/112, 139

(56) References Cited

U.S. PATENT DOCUMENTS

| | | | |
|---|---|---|---|
| 5,301,458 A | | 4/1994 | Deyoreo et al. |
| 5,369,908 A | * | 12/1994 | Morales .................. 43/111 |
| 5,628,142 A | * | 5/1997 | Kitterman et al. ........... 43/114 |
| 5,634,292 A | * | 6/1997 | Kitterman ................... 43/111 |
| 5,829,187 A | * | 11/1998 | Weiser ....................... 43/114 |
| 6,009,662 A | * | 1/2000 | Chang ........................ 43/112 |

FOREIGN PATENT DOCUMENTS

| | | |
|---|---|---|
| JP | 50-50759 | 5/1975 |
| JP | 50-112677 | 9/1975 |
| JP | 54-154277 | 10/1979 |
| JP | S57-001573 U | 5/1980 |
| JP | S58-113372 U | 8/1983 |
| JP | S58-150981 U | 10/1983 |
| JP | A 2000-50 | 1/2000 |
| JP | A 2000-501605 | 2/2000 |
| WO | WO 94/03053 | 2/1994 |
| WO | WO 97/20460 | 6/1997 |

* cited by examiner

Primary Examiner—Charles T. Jordan
Assistant Examiner—Jordan M Lofdahl
(74) Attorney, Agent, or Firm—Oliff & Berridge, PLC

(57) ABSTRACT

In an apparatus for trapping and killing insects using an electric discharge between electrodes to count and/or kill insects or the like, the present invention presents a technology to almost certainly count and/or kill the insects or the like even when the applied voltage is set low. In an insect-trapping/killing apparatus as an embodiment of the invention, when an insect or the like enters the space between an outer electrode and a central electrode, an electric discharge passes through the insect or the like, whereby the insects or the like is killed. After that, the central electrode is rotated in a preset direction to remove the insect or the like downwards by the frictional force. Since the removing mechanism as described above solves the problem of the clogging of the space between electrodes by the insect or the like, the distance between the electrodes can be set as small as the size of the body of the insect or the like, and the applied voltage can be set accordingly low.

2 Claims, 4 Drawing Sheets

6 1 or 6 2

6 1 or 6 2

APPARATUS FOR TRAPPING AND KILLING INSECTS

TECHNICAL FIELD

The present invention relates to an apparatus for trapping and killing insects and/or small animals (which are inclusively referred to as the "insect or the like" or "Insect" hereinafter). The apparatus is referred to as the "insect-trapping/killing apparatus" hereinafter.

BACKGROUND ART

An outbreak of a large number of Insects harmful to agricultural products causes significant damages to the products. In order to prevent such damages, various countermeasures, such as sprinkling a large amount of agricultural chemical insecticides, are conventionally taken. In addition, various surveys are conducted to detect an outbreak of harmful insects in its early phase or to confirm the effect of countermeasures taken against the harmful insects.

In a survey for grasping the state of an outbreak of Insects or the process of their eradication, an apparatus called a "pheromone trap" is often used, which attracts and traps the Insects using a pheromone or other attractant for attracting particular kinds of Insects. The pheromone trap is placed on the survey site for a preset time period, and the number of Insects trapped thereby is checked at regular intervals to confirm the state of outbreak of the Insects or the effect of the countermeasures taken against it. This method, however, has a problem in that a large amount of time and labor is consumed to count the number of Insects trapped by the pheromone traps. Further, it is generally necessary to count the number of the trapped creatures every twenty-four hours. Thus, according to the conventional practice, the trapped Insects are manually collected every twenty-four hours, which also consumes a large amount of time and labor.

Taking account of the above problems, the applicant proposed an apparatus for automatically attracting, trapping, killing and counting Insects, as disclosed in Japanese Unexamined Patent Publication No. 2000-50. The apparatus is constructed so that a particular kind of Insect attracted by an attracting means, such as pheromone, is guided into a space between a pair of electrodes to which a high voltage is applied, and an electric discharge that passes through the Insect when the creature arrives at the space between the electrodes is counted to obtain the number of the trapped creatures. Here, if the Insect that has already been counted is not completely trapped and is allowed to escape, it is possible for the same creature to be counted again, which devalues the counting accuracy. In order to prevent this, the above-described apparatus is constructed to apply a high voltage to the electrodes so that the counted Insect is completely trapped and killed.

In the above apparatus, however, various problems arise when the distance between the electrodes and the voltage applied to the electrodes are not appropriately determined. For example, when the voltage is too high, the dead body of the Insect killed by the electric discharge easily adheres to the electrode due to static electricity. Another problem is that a higher voltage makes it more difficult to prepare the power source (for example, when the solar cell is not available). Still another problem is that a higher voltage is naturally dangerous to the human body, too. When, on the other hand, the voltage is too low, the killing capability is inadequate, so that the above-described problem of multiple-count of the same Insect arises. When the distance between the electrodes is reduced, electric discharge of an adequate energy may be generated even at a low voltage. This, however, causes another problem that a large Insect may clog the space between the electrodes.

When the Insect to be trapped and killed has wings, for example a moth, the above problem is particularly remarkable. That is, the electric resistance of a wing of an Insect is greater than that of the body, so that the electric current is sometimes inadequate to kill the insect if the electric discharge first passes through the wing. One of the methods of preventing this situation is to reduce the distance between the electrodes to ensure the electric discharge to occur through the body of the Insect. Another is to adequately increase the voltage between the electrodes so that the Insect is killed even through the wings. By the former method, however, an Insect with its wings spread may clog the space between the electrodes, and by the latter method, the electrostatic adhesion may occur.

DISCLOSURE OF THE INVENTION

In view of the above problems, in an insect-trapping/killing apparatus including:

at least a pair of electrodes for generating an electric discharge;

a voltage-applying means for applying a preset voltage between the electrodes; and a removing mechanism for moving at least one of the pair of the electrodes to remove an insect or the like from the space between the electrodes, the insect-trapping/killing apparatus according to the invention is characterized in that:

the apparatus further includes a pair of roller electrodes disposed parallel to each other as said pair of the electrodes, and an electrode-driving mechanism for rotating each roller electrode on a central axis thereof; and the insect or the like existing in the space between the electrodes is removed from the space between the electrodes when the electrode-rotating mechanism rotates the pair of the roller electrodes in opposite directions.

The second insect-trapping/killing apparatus according to the present invention is characterized by including a pair of rollers disposed parallel to each other with the distance preset according to the size of an insect or the like to be killed; a guiding means for guiding the insect or the like into the space between the pair of rollers; and a roller-driving mechanism for rotating each roller on a central axis thereof, wherein the insect or the like is pulled into the space between the pair of rollers and squashed thereby when the roller-driving mechanism rotates the pair of rollers in opposite directions.

In the first insect-trapping/killing apparatus, at least one electrode is constructed as movable, and when the electrode is moved with a motor or other driving device, the Insect existing between the electrodes is removed from there. The manner of removing the Insect from the space between the electrodes by moving the electrode is appropriately determined by taking account of the arrangement and/or shape of the electrodes. For example, in the present invention, the pair of electrodes is a pair of cylindrical electrodes disposed parallel to each other, and one or both of the electrodes are rotated on the central axis of the cylinder to remove the Insect existing between the electrodes by the frictional force.

When the pair of electrodes is a pair of plate electrodes disposed parallel to each other, one possible method is to move one electrode parallel to the other to remove the Insect existing between the electrodes by the frictional force. Another possible method is to temporarily increase the distance between the electrodes to let fall the Insect existing between the electrodes due to the gravitational force. With the removing mechanism as described above, the Insect can certainly be removed even when the distance between the electrodes is set as small as the size of the body of the Insect, where the size is measured excluding wings and other soft parts, so that the problem of the clogging the space between electrodes by the Insect never arises.

Thus, in the first insect-trapping/killing apparatus, the distance between the electrodes can be reduced without concerning the problem of the clogging of the space between the electrodes by the Insect, which enables the generation of a strong electric discharge even at a relatively low voltage. The reduction of the distance between the electrodes ensures the contact between the body of the Insect and the electrode, so that the Insect can be more certainly killed. The lowering of the voltage also provides other effects such that the problem of the electrostatic adhesion hardly arises and that it is less dangerous to the user. Further, when there is no need to generate a high voltage, the power supply system can be simplified, so that the cost is reduced.

The first insect-trapping/killing apparatus may be further provided with a discharge detection means for counting the occurrence of electric discharges between the electrodes, which makes an apparatus for counting and killing insects that automatically traps, kills and counts Insects. Since, in the apparatus for counting and killing insects constructed using the first insect-trapping/killing apparatus, the Insects are almost certainly killed, the problem of the multiple-count of the same Insect never arises, so that high counting accuracy is obtained. The above insect-trapping/killing apparatus, or the apparatus for counting and killing insects, may be further provided with attracting means for attracting a particular kind of Insect, using attractants, for example, to make an automatic apparatus for trapping, killing and/or counting only a particular kind of Insect.

The second insect-trapping/killing apparatus is constructed so that an Insect is guided into the space between a pair of rollers disposed parallel to each other with a distance slightly smaller than the size of the Insect, and when the rollers are rotated in the opposite directions, the Insect is squashed by the rollers on both sides; thus destroying the Insect physically. The second insect-trapping/killing apparatus requires no electrode for killing the Insect by electric discharge, so that the above-described problems never occur. The electrical system can be as simple as driving the motor alone for rotating the rollers, which can be constructed at low cost. Since there is no need to generate a high voltage, it is less dangerous to the user.

The second insect-trapping/killing apparatus may further include detection means for detecting the arrival of an Insect, and the roller-driving mechanism rotates the rollers when the Insect is detected with the detection means. This construction preferably reduces the consumption of electricity. For example, the detection means is constructed to detect an electric discharge generated when an Insect enters the space between a pair of electrode disposed at a preset position in a guiding passage, or to detect the arrival of an Insect based on the output signal of a photosensor or sound sensor disposed at a preset position in a guiding passage. The detection means may also be used to count the number of the Insects.

BRIEF DESCRIPTION OF THE DRAWINGS

FIG. 7A is a front view and FIG. 7B is a side view.

BEST MODES FOR CARRYING OUT THE INVENTION

Figure 1:
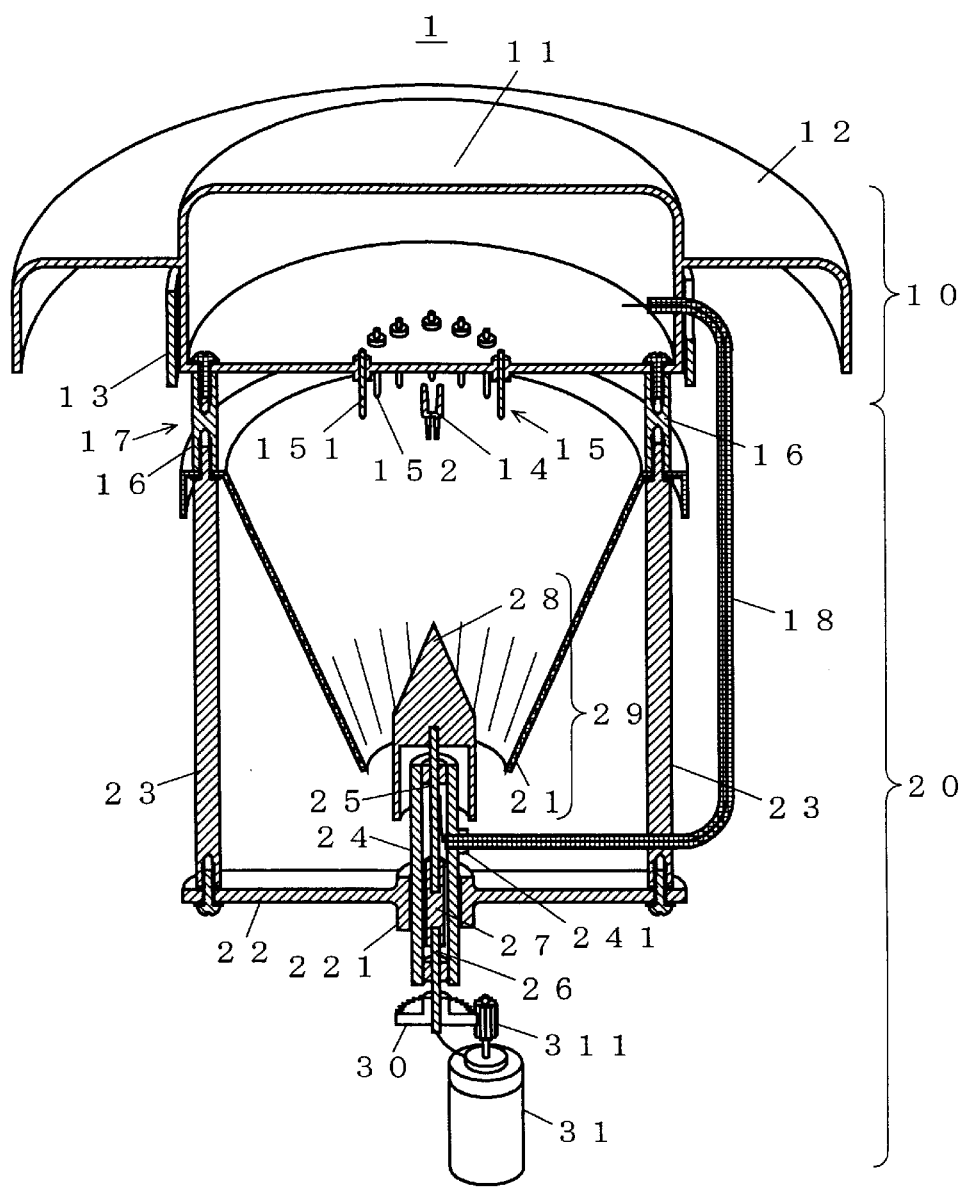
FIG. 1 is a vertical sectional view of an insect-trapping/killing apparatus as the first embodiment of the invention, viewed obliquely from above.

FIG. 1 is a vertical sectional view of an insect-trapping/killing apparatus 1 as the first embodiment of the invention, viewed obliquely from above. The insect-trapping/killing apparatus 1 is composed mainly of an upper structure 10 for attracting and killing Insects and a lower structure 20 for counting and removing the dead Insects. The construction of each part is described below.

The upper structure 10 includes an electrical system container 11 containing a power source, controller and other elements (not shown), a brim 12 for preventing the rain from entering any part of the apparatus, an entrance adjustment ring 13 being cylindrical and slidably attached on the side of the electrical system container 11, etc. A detachable attractant holder 14 is attached to the center of the bottom of the electrical system container 11. Around the attractant holder 14 are 2×N pieces of needle electrodes including N pieces of anodes 151 and N pieces of cathodes 152 (where N is a positive integer), which are arranged so that the anodes 151 and cathodes 152 alternately are placed at preset intervals. The whole group of electrodes are referred to as the "shocking electrodes 15" hereinafter. A preset voltage is applied between the N pieces of anodes 151 and the N pieces of cathodes 152 from the above power source. This means that, taking any pair of adjacent needle electrodes, the pair includes an anode 151 and a cathode 152, and the above voltage is applied between them.

The lower structure 20 includes a funnel-shaped outer electrode 21 attached via metallic connectors 16 to the bottom of the electrical system container 11. The outer electrode 21 is electrically connected via the metallic connectors 16 to the power source in the electrical system container 11. The space between the upper end of the outer electrode 21 and the lower end of the electrical system container 11 is an entrance 17 for allowing the approach of Insects, the width of which can be adjusted by sliding the entrance adjustment ring 13.

Figure 2A:
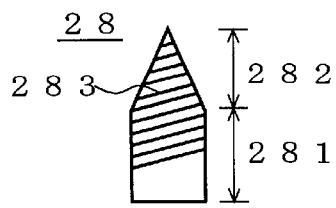
FIG. 2A is a side view of the central electrode of the insect-trapping/killing apparatus shown in FIG. 1.
Figure 2B:
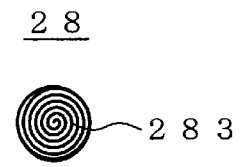
FIG. 2B is the plan view of the same.

Right under the outer electrode 21, a beam 22 is horizontally suspended with a pair of suspension rods 23. A bearing-holding opening 221 is formed at the center of the beam 22, by which a cylindrical bearing 24 made of insulating material is held. At the upper part and the lower part of the bearing 24, an electrode-supporting shaft 25 made of electrically conductive material and a driving shaft 26 made of rigid material are rotatably held. These two shafts are connected by a connector 27 made of insulating material. In one side of the bearing 24, a hole 241 for supplying electric power is formed, in which one end of a feeder line 18 is inserted. In the bearing 24, aforementioned end of the feeder line 18 is in electrical contact with the side of the electrode-supporting shaft 25; the other end is connected to the power source in the electrical system container 11. The electrode-supporting shaft 25 protrudes from the bearing 24 upwards, and a central electrode 28 is fixed to the end thereof. FIGS. 2A and 2B show the form of the central electrode 28, where FIG. 2A is a side view and FIG. 2B is a plan view. The central electrode 28 is an electrically conductive part having a cylindrical base part 281 and a conical tip part 282, where a spiral ridge 283 extending from the apex of the tip part 282 is formed over the side thereof. The central electrode 28 is inserted into the opening at the lower end of the outer electrode 21. The combination of the outer electrode 21 and the central electrode 28 is referred to as the killing and counting part 29 hereinafter.

Referring to FIG. 1 again, the driving shaft 26 protrudes from the bearing 24 downwards, and a wheel gear 30 is fixed to the end thereof. The wheel gear 30 is in engagement with a driving gear 311 fixed to the rotation shaft of a motor 31. The motor 31 is supplied with electric power from the power source in the electrical system container 11 through a feeder line (not shown).

The insect-trapping/killing apparatus 1 constructed as described above kills and counts Insects as follows. First, an Insect attracted by the attractant held in the attractant holder 14 enters the apparatus through the entrance 17 and moves toward the attractant. In the course of the movement, the Insect passes between a pair of needle electrodes (anode 151 and cathode 152) arranged around the attractant holder 14. There it receives an electric shock (or discharge) from the electrode pair and is stunned or rendered unconscious. In this condition, it falls within the outer electrode 21 and reaches the killing and counting part 29. In the killing and counting part 29, a voltage is applied between the outer electrode 21 and the central electrode 28, where a second discharge passes through the Insect when it passes through that part. By this discharge, the Insect is almost certainly killed. The controller detects the discharge and stores its cumulative count in a memory as the number of dead Insects. It should be noted that the application of voltage between the electrodes causes no leakage of electricity from the driving shaft 26 because the insulating connector 27 is disposed between the electrode-supporting shaft 25 and the driving shaft 26.

When the discharge is detected in the killing and counting part 29, the controller supplies electric power from the power source to the motor 31. Then, the central electrode 28 starts rotating. While the central electrode 28 is rotating, if an Insect clogs the space between the outer electrode 21 and the central electrode 28, the Insect is conveyed downwards by the ridge 283 formed on the side of the rotating central electrode 283 and is then forcefully removed from the killing and counting part 29. Further, by forming a number of linear ridges on the inner surface of the lower part of the outer electrode 21, as shown in FIG. 1, the Insect is prevented from slipping on the inner surface of the outer electrode 21, so that the Insect is almost certainly removed and more quickly. When the Insect is completely removed, the electric discharge stops. On detecting the stop of the electric discharge, the controller stops the power supply to the motor 31.

In the insect-trapping/killing apparatus 1, when the voltage applied to the shocking electrodes 15 is too high, the Insect may adhere to the needle electrode due to the static electricity in the process of killing the Insect. When, on the other hand, the voltage is too low, it is impossible to obtain a discharging energy large enough to give an adequately strong shock to the Insect. Therefore, in order to obtain an adequate discharging energy even at a low voltage, the intervals of the needle electrodes are set small; about 5mm, for example. When the intervals of the needle electrodes are as small as that, even a voltage of about 1000 to 3000V can produce such a strong electric discharge that can disable the Insect. In the insect-trapping/killing apparatus 1, if there is an obstacle in the path for the Insect to fall from the shocking electrodes 15 to the killing and counting part 29, static electricity may be accumulated there and the Insect may adhere to it. In the insect-trapping/killing apparatus 1, however, there is no such obstacle, so that the above-mentioned problem never arises.

Figure 3:
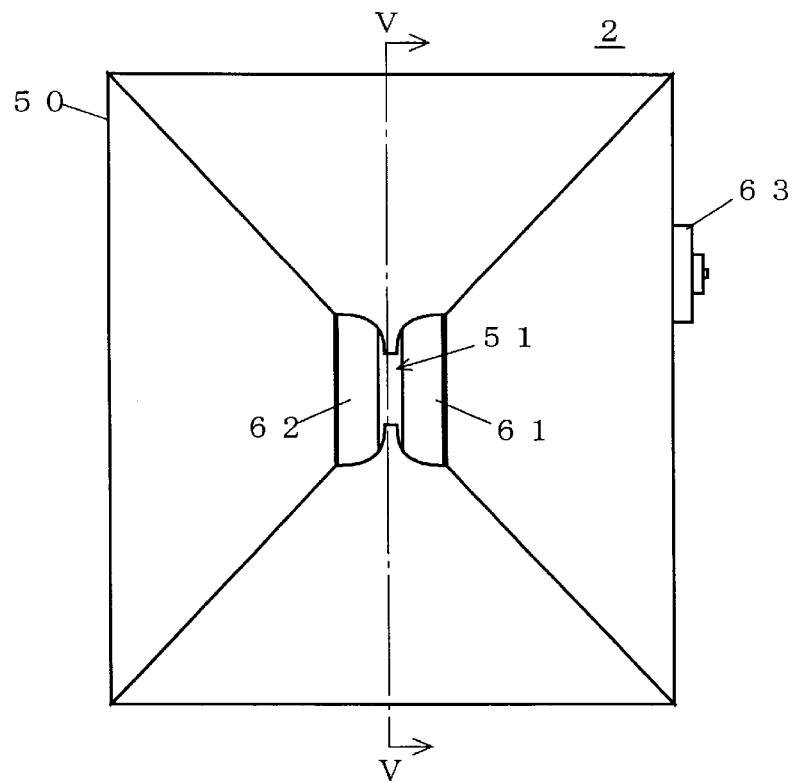
FIG. 3 is a plan view of an insect-trapping/killing apparatus as the second embodiment of the invention.
Figure 4:
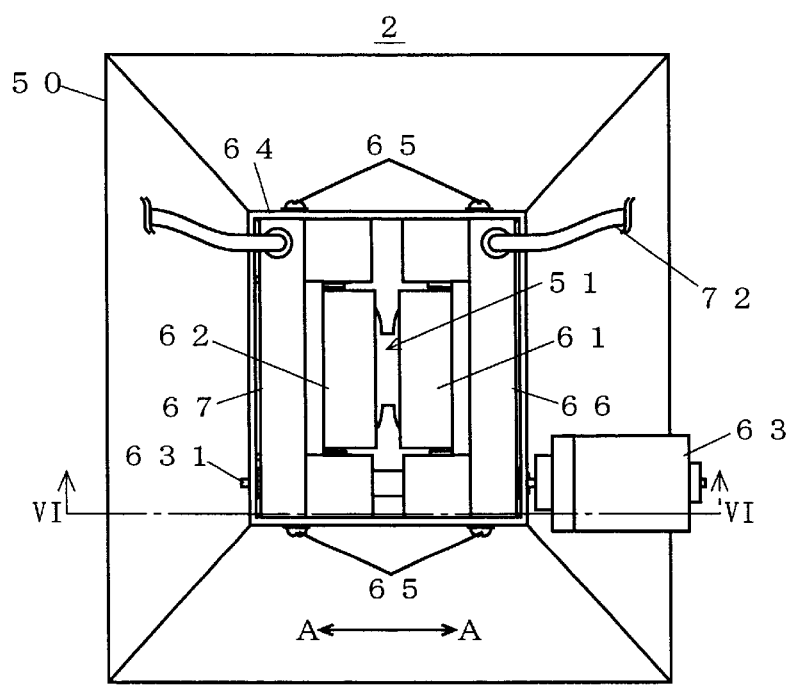
FIG. 4 is a bottom view of the insect-trapping/killing apparatus as the second embodiment of the invention.
Figure 5:
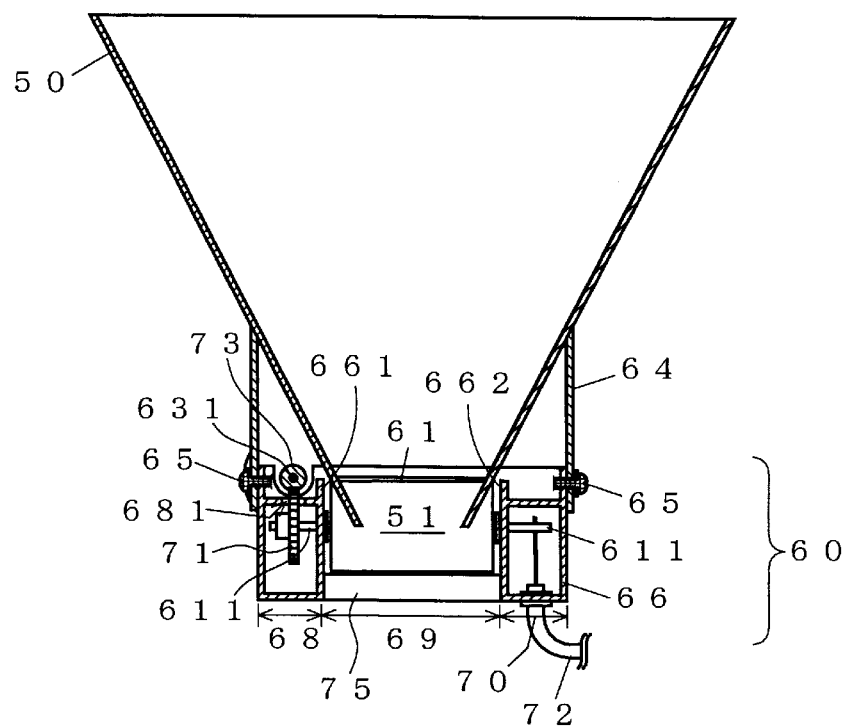
FIG. 5 is a cross sectional view at line V—V in FIG. 3.
Figure 6:
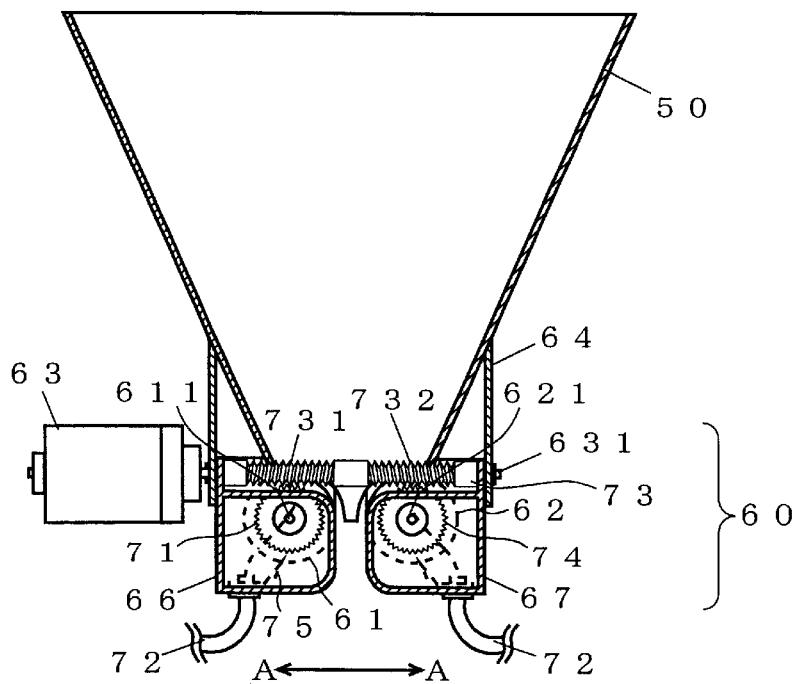
FIG. 6 is a cross sectional view at line VI—VI in FIG. 3.

Another insect-trapping/killing apparatus is described below as the second embodiment of the invention, referring to FIGS. 3–6. FIG. 3 is a plan view of the insect-trapping/killing apparatus 2 of the second embodiment, FIG. 4 is a bottom view of the same, FIG. 5 is a cross sectional view at line V—V in FIG. 3, and FIG. 6 is a cross sectional view at line VI—VI in FIG. 4.

The insect-trapping/killing apparatus 2 is composed mainly of a trapping part 50 in the shape of a reversed square pyramid having an opening (removal opening) 51 at the lower end, a killing and removing part 60 attached to the lower part of the trapping part 50, and a controller (not shown) including a power source. Detailed construction of the killing and removing part 60 is described below.

The killing and trapping part 60 includes a rectangular body frame 64 and a pair of roller units 66 and 67 attached to the body frame 64 with threads 65. By loosening the threads 65, the position of each roller unit with respect to the body frame 64 can be changed along the direction A—A in FIGS. 4 and 6. The roller unit 66 is divided by partitions 661 and 662 into three parts: gear chamber 68, roller room 69 and wiring chamber 70. The roller room 69 includes a roller electrode 61 having a rotation shaft 611 made of electrically conductive material. The rotation shaft 611 is rotatably held by the partitions 661 and 662. Also, the roller room 69 is provided with a plate-shaped scraper 75 whose edge is in light contact with or at a slight distance from the side of the roller electrode 61. In the gear chamber 68, on the other hand, a wheel gear 71 made of resin is fixed to the end of the rotation shaft 611. The upper part of the wheel gear 71 is exposed to the outside through an opening 681 formed in the top wall of the gear chamber 68. In the wiring chamber 70, a feeder line 72 is taken into the chamber through the floor. One end of the feeder line 72 is in electrical contact with the side of the rear part of the rotation shaft 611. The other end of the feeder line 72 is connected to the power source (not shown). The other roller unit 67, including a roller electrode 62 having the rotation shaft 621, a wheel gear 74 fixed to the rotation shaft 621, etc., is constructed in the same manner as described above.

The motor 63 has a rotation shaft 631 rotatably supported by the body frame 64. A worm gear 73 having on its side a pair of threads 731 and 732 of opposite spiraling directions is fixed to the rotation shaft 631. The threads 731 and 732 of the worm gear 73 are engaged with the wheel gears 71 and 74, respectively.

In using the insect-trapping/killing apparatus 2, first, the positions of the roller units 66 and 67 are adjusted so that the distance between the roller electrodes 61 and 62 corresponds to the size of the Insect to be trapped and killed. Further, an attractant is set at a proper position close to or inside of the trapping part 50. Thus prepared, the insect-trapping/killing apparatus 2 is placed at a predetermined site where the number of Insects should be surveyed, and the power supply is turned on. Then, a voltage is applied to the roller electrode 61 and 62 through the feeder line 72 and the rotation shafts 611 and 621. Here, since the wheel gears 71 and 74 are made of resin, the application of the voltage causes no leakage of electricity from the rotation shafts 611 and 621.

When an Insect attracted by the attractant enters the trapping part 50 and reaches the removal opening 51, an electric discharge passes through the Insect between the roller electrodes 61 and 62, whereby the Insect is killed. The controller detects the electric discharge and stores its cumulative count in a memory as the number of dead Insects. Also, on detecting the electric discharge, the controller supplies electric power to the motor 63. Then, the roller electrodes 61 and 62 rotate inwards, whereby the Insect existing at the removal opening 51 is pulled into the space between the roller electrodes 61 and 62, and is finally removed downwards. Here, even if the dead body (or part of it) of the Insect adheres to the side of the roller electrode 61 or 62, the scraper 75 almost certainly scrapes off the dead body, so that the following counting and removing operation can be performed without any trouble.

In the insect-trapping/killing apparatus 2, the voltage applied between the roller electrodes 61 and 62 can be lowered by setting the distance between the roller electrodes 61 and 62 smaller than the size of the body of the Insect to be trapped and killed. That is, when the distance between the roller electrodes 61 and 62 is adequately small, the Insect is squashed thereby and almost certainly killed. Thus, since there is no need to generate a strong electric discharge to kill the Insect, what is necessary is to apply between the roller electrodes 61 and 62 only a low voltage for generating an electric discharge enough to stun or render the Insect unconscious. When the distance between the roller electrodes 61 and 62 is reduced as described above, there is a possibility that the space between the roller electrodes 61 and 62 will be clogged by another Insect with a larger and harder body than the Insect to be trapped and killed. In view of these problems, it is preferable to provide the apparatus with a mechanism for restricting the size of the entrance in the upper part of the trapping part 50 (e.g. like the entrance adjustment ring 13 of the apparatus in the first embodiment), to dispose a mesh gate at or in the upper opening of the trapping part 50 or to use an attractant for attracting only the Insect to be trapped and killed. Use of the attractant is also preferable in order to prevent beneficial insects, which should not be trapped and killed, from being mistakenly killed.

In the insect-trapping/killing apparatus 2, the rollers for removing the Insect are also used as the electrodes. Otherwise, additional electrodes for electric discharge may be provided at a proper position (e.g. right over the removal opening 51) in the trapping part 50 while using the rollers mainly for removing the Insect.

Figure 7A:
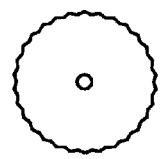
FIGS. 7A and 7B show a preferable form of the roller electrode, where
Figure 7B:

FIGS. 7A and 7B show a preferred form of the roller electrode 61 or 62, where FIG. 7A is a front view and FIG. 7B is a side view. The ridges formed on the side of the roller electrodes 61 and 62 as shown in FIG. 5 provide a surer grasp on the Insect and hence improve the certainty of the removal. Also, when squashing the Insect with the roller electrodes 61 and 62 as described above, the ridges formed on the side of the rollers improve the killing power.

Figure 8:
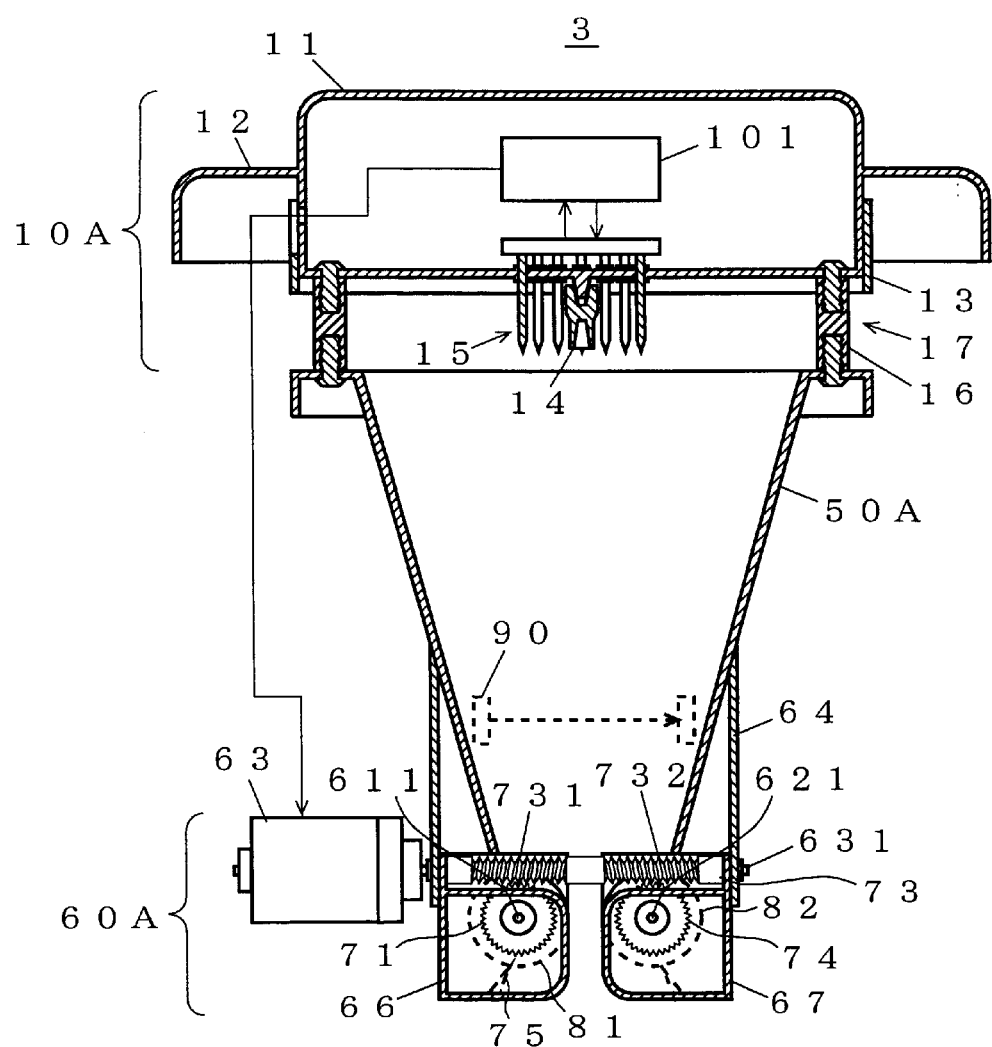
FIG. 8 is a vertical sectional view of an insect-trapping/killing apparatus as the third embodiment of the invention.

FIG. 8 is a vertical sectional view of an insect-trapping/killing apparatus 3 as the third embodiment of the invention. The insect-trapping/killing apparatus 3 includes an upper structure 10A constructed almost the same as the upper structure 10 used in the insect-trapping/killing apparatus 1 of the first embodiment, the trapping part 50A and the killing and removing part 60A both constructed almost the same as the trapping part 50 and the killing and removing part 60 of the insect-trapping/killing apparatus 2 of the second embodiment. In the insect-trapping/killing apparatus 3, the rollers 81 and 82 included in the killing and removing part 60A are not used as the electrodes for generating the electric discharge but used mainly to physically squash the Insect and remove it downwards. The distance between the rollers 81 and 82 is set slightly smaller than the size of the body of the Insect to be trapped and killed, where the size is measured excluding the wings and other soft parts.

The insect-trapping/killing apparatus 3 constructed as described above traps and kills insects as follows. First, an Insect attracted by the attractant held in the attractant holder 14 enters the apparatus through the entrance 17 and moves toward the attractant. In the course of the movement, the Insect passes between a pair of the shocking electrodes 15 arranged around the attractant holder 14, where it receives an electric shock (or discharge) from the electrode pair. From the occurrence of the electric discharge, the controller 101 enclosed in the electrical system container 11 of the upper part 10 detects the arrival of the Insect, and starts supplying electric power to the motor 63. Then, the rotation shaft 631 of the motor 63 rotates in the preset direction, and the rollers 81 and 82 rotate in opposite directions to pull downwards any object existing between them. The Insect, having received the electric discharge, is stunned or rendered unconscious. Being inactive, it falls within the trapping part 50A and reaches the space between the rollers 81 and 82. There, since the rollers 81 and 82 are rotating as described above, the Insect is pulled into the space between the rollers 81 and 82, and is killed by being squashed on both sides. After an adequate time period to completely remove the Insect has elapsed, the controller 101 stops the power supply to the motor 63.

In the above description, it is assumed that the controller 101 supplies the electric power to the motor 63 only when the electric discharge passes through the Insect. When the exhaustion of the power source does not matter at all, the controller 101 may supply the electric power to the motor 63 all the time. This allows an omission of the circuit for monitoring the electric discharge and for performing controls based on the detection of the electric discharge, which decreases the production cost of the apparatus.

Further, in the above description, the number of Insects is obtained by counting the occurrence of electric discharge between the electrodes through the Insect. The number of Insects may be obtained by other methods. In the apparatus 3 of FIG. 8, for example, a counting part 90 including a photosensor may be disposed on the falling path of the Insect disabled by the electric discharge from the shocking electrodes 15.

What is claimed is:

1. An apparatus for trapping and killing insects, characterized by comprising a pair of rollers disposed parallel to each other with a distance preset according to a size of an insect or the like to be killed; a guiding means for guiding the insect or the like into a space between the pair of rollers; and a roller-driving mechanism for rotating each roller on a central axis thereof, wherein the insect or the like is pulled into the space between the pair of rollers and squashed thereby when the roller-driving mechanism rotates the pair of rollers in opposite directions.

2. The apparatus for trapping and killing insects according to claim 1, characterized by comprising an attracting means for attracting the insect or the like and an electric discharging means for generating electric discharge to disabled the insect or the like attracted by the attracting means, wherein the pair of rollers are disposed on a falling path of the insect or the like disabled by the electric discharging means.

* * * * *